United States Patent [19]

Gergely

[11] 4,035,125
[45] July 12, 1977

[54] JAM PREVENTION UNIT FOR EXTRUSION PROCESS

[75] Inventor: Alex S. Gergely, Bon Air, Va.

[73] Assignee: Philip Morris Incorporated, New York, N.Y.

[21] Appl. No.: 623,509

[22] Filed: Oct. 17, 1975

[51] Int. Cl.² .......................................... B29F 3/00
[52] U.S. Cl. .............................. 425/141; 425/142; 425/378 R; 264/40.7
[58] Field of Search ........... 269/296; 425/140, 141, 425/142, 377, 378, 380, 404; 264/40.5, 40.7

[56] References Cited

U.S. PATENT DOCUMENTS

| | | | |
|---|---|---|---|
| 3,538,210 | 11/1970 | Gatto | 425/71 X |
| 3,579,623 | 5/1971 | Thomson et al. | 264/135 |
| 3,813,200 | 5/1974 | Gergely | 425/140 |
| 3,828,726 | 8/1974 | Dietze et al. | 269/296 X |
| 3,834,349 | 9/1974 | Dietze et al. | 269/296 X |

Primary Examiner—Richard B. Lazarus
Attorney, Agent, or Firm—Cameron, Kerkam, Sutton, Stowell & Stowell

[57] ABSTRACT

There is disclosed a device for ameliorating the effects of an extrudate jam of an entrance sizing aperture into a cooling chamber, the extrudate being provided by an extrusion process apparatus associated with the cooling chamber. More specifically, the cooling chamber includes a plurality of serially disposed, longitudinally spaced sizing discs for successively sizing the extrudate. The sizing discs are removably mounted within a tray and upon a jam or a break of the extrudate, the sizing discs may be readily removed through a door within the cooling chamber, to permit rapid cleaning thereof, thus minimizing the shut down time of the extrusion process apparatus. Further, there is disclosed a pneumatic drive cylinder whereby upon detection of an outsized extrudate, the drive cylinder is actuated to move the assembly of the tray and its plurality of sizing discs in the direction of the movement of the extrudate. As a result, the extrudate is stretched, thereby tending to free the apertures of the sizing discs as well as the entrance sizing aperture into the cooling chamber.

13 Claims, 4 Drawing Figures

JAM PREVENTION UNIT FOR EXTRUSION PROCESS

CROSS REFERENCE TO RELATED APPLICATION

Reference is hereby made to co-pending application Serial No. 623,497 entitled "Improved Jam Prevention Unit for Extrusion Processing Apparatus" filed on Oct. 17, 1975, in the name of Alex S. Gergely and assigned to the assignee of this invention.

BACKGROUND OF THE INVENTION

1. Field of the Invention

This invention is related to extrusion process apparatus and more particularly, to associated devices for the prevention of and/or assisting the removal of a jammed extrudate from a cooling chamber associated with the extrusion process apparatus.

2. State of the Prior Art

It is known to form certain types of continuous stock workpieces, such as rod and tubular shaped articles, from thermoplastic material by extruding the same as a heated extrudate from an extruder followed by passage of the heated extrudate through a cooling bath to remove heat therefrom to set or rigidize the material of the continuous stock which thereafter may be sectioned into individual articles for a particular intended end use. The extrudate further may be shaped and sized by passing the same through a closing or sizing aperture located advantageously at the entrance to the cooling bath. U.S. Pat. Nos. 3,538,210 and 3,579,623 both describe methods with which tubular articles can be made, such articles being characterized by having circumferential dimension of precise nature within a particular range of values. As is well-known in the extrusion art, and as is exemplified by the aforementioned patents, the extrudate if it is in tubular form generally will be issued from the extruder at a size somewhat larger than the final finished product and then directed through the sizing aperture to draw down the extrudate to the requisite final dimension. The extrudate will have, for formation of a workpiece of given size and with respect to the extrudate line speed and placement of extruder in relation to the cooling bath entrance, a predetermined dimension during its travel from the extruder to the sizing aperture, such predetermined dimension diminishing uniformally as the extrudate approaches the closing aperture. If for any reason the extrudate should leave the extruding means at an outsized dimension, that is at a dimension greater than intended either by way of overall workpiece diameter at any given location, or by reason of greater thickness of the tube wall than intended, it is possible for the outsized extrudate upon entry through the closing aperture to jam the same. This can result in shutdown of the forming line apparatus as well as requiring that the aperture be freed, a not easy task because the plastic state extrudate when solidified in the aperture is difficult and time consuming to remove. Furthermore, if the extrudate were outsized to a point that it would cause a jam in the sizing aperture and a breakage in the extrudate occurred without fully jamming the sizing aperture, it is probable that cooling liquid from the bath thereof would escape through the aperture and splash onto adjacent machinery including the extruding apparatus to the detriment of the latter.

In the above mentioned U.S. Pat. No. 3,538,210, there is shown extrusion apparatus including a liquid filled cooling chamber having an entry therein through a sizing aperture which has a tendency to be jammed by an outsized extrudate. Within the cooling chamber, there is disposed an assembly of sizing discs longitudinally spaced of each other to successively size the extrudate that is being drawn through the cooling chamber. The assembly of sizing plates is secured together in the noted patent by a plurality of elongated threaded connecting rods, the rods being enclosed by spacer sleeves to space the successively aligned sizing discs. Further, there is disclosed that lateral support for the foredescribed assembly is provided by a plurality of side braces interconnected between a side of the cooling chamber and the elongated connecting rods. In the event that the extrudate that is being drawn through the cooling chamber should jam, it will often be necessary to remove the sizing disc assembly from the cooling chamber, to be disassembled whereby the extrudate may be cleaned and removed from the sizing discs. It is understood that such a process is time consuming resulting often in the prolonged shut down of the extrusion process apparatus.

In U.S. Pat. No. 3,813,200 there is disclosed a device for preventing a jam of the sizing aperture into a cooling chamber through which the extrudate is drawn. In particular, the jam preventing device includes an electrical optical assembly for detecting an outsized extrudate, in the form of a light beam projecting element and a photosensitive element disposed to receive normally the light beam that is directed in the vicinity of the entrance sizing aperture. Upon detection of the outsized extrudate, a cutter blade is actuated to move from a first to a second position across the entrance sizing aperture, whereby the extrudate is severed at that point permitting it to be drawn through the cooling chamber. At the same time, the extruder is deactuated whereby no more extrudate is introduced into the cooling chamber. In the above-identified co-pending application of Gergely, there is disclosed an improvement of this jamming device, wherein a circular blade is rotated to provide a relatively fast cutting motion to sever the extrudate at the entrance sizing aperture.

SUMMARY OF THE INVENTION

It is an object of this invention to provide an assembly of sizing discs that is relatively easy to rapidly clean and to replace within the cooling chamber, associated with the extrusion process apparatus.

It is a further object of this invention to provide a new and improved jam preventing device wherein the assembly of the sizing discs is moved in the direction of extrudate flow, tending to stretch the extrudate freeing it from the sizing apertures of the discs and permitting its movement therethrough and from the cooling chamber.

In accordance with these and other objects of this invention, there is provided apparatus for use in conjunction with an extrusion process apparatus including a cooling chamber having a sizing, entrance opening into which the extrudate is introduced and an assembly of sizing discs disposed serially and laterally spaced of each other, whereby the extrudate may be directed through the axially aligned sizing apertures within each of the aforementioned discs. The plurality of sizing discs are mounted in a tray for ready removal therefrom in case of jamming, whereby the sizing discs may be readily cleaned and replaced in a minimum of time, thereby reducing the shut down time of the entire extrusion process apparatus.

In a further aspect of this invention, there is disclosed a drive means in the form of a pneumatic drive cylinder which is operative upon detecting an outsized extrudate. The drive means is actuated to move the assembly and in particularly the tray of sizing discs in the direction of the movement of the extrudate, whereby it is stretched, thereby tending to free the extrudate from the sizing apertures of the discs and permitting either the withdrawal of the extrudate by an extrudate advancing unit or facilitate the cleaning of the sizing disc(s). In one illustrative embodiment of this invention, the pneumatic drive cylinder is actuated substantially simultaneously with an extrudate severing device disposed at the entrance sizing aperture of the cooling chamber.

BRIEF DESCRIPTION OF THE DRAWINGS

A full understanding of the nature and objects of the invention will be had from the following detailed description taken in conjunction with the accompanying drawings in which.

DESCRIPTION OF THE PREFERRED EMBODIMENTS

Figure 1:
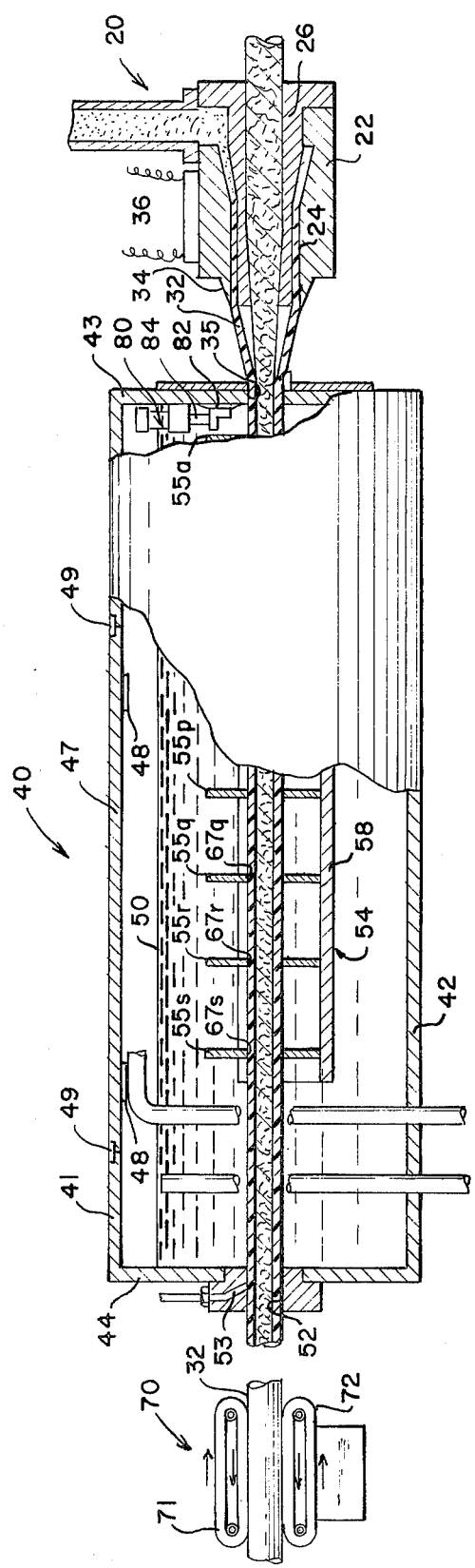
FIG. 1 is a sectional view of apparatus with which extruded plastic tubing may be sized to have a circumferential dimension within predetermined limits.

With regard to the drawings and in particular to FIG. 1, there is shown an extruder unit 20, a cooling chamber 40 wherein the tubing is sized and a tube pulling unit 70. The extruder 20 is of conventional construction and includes an extruder body 22 in which is formed a central cavity 24 for supportingly receiving mandrel 26, the latter being located forward of a reservoir (not shown) which is filled with a molten plastic, and being spaced from the cavity within the body 22 such as to provide that a continuous cylindrically shaped tubular extrudate 32 issues from the mouth of the extruder 20 at a rate determined by the speed at which the extruder screw (not shown) rotates, the extrudate 32 on leaving the extruder generally having an outer diameter as at 34 of about twice the diameter of the finished product and being fluted.

The extruder body 22 is preferably encased with a heater unit 36 to maintain the plastic in its reservoir in a molten condition. For example, where the extrudate material is polyethylene, the extruder is heated sufficiently to ensure that the polyethylene extrudate will issue from the adapter unit at a temperature in a range of about 350°–390° F. A pressure differential of greater pressure acting on the inside of the extrudate 32 and tending to enlarge it as it passes through the cooling chamber 40, is utilized as an essential force in sizing the extrudate to provide it with a circumferential dimension within the range prescribed. As was mentioned, the extrudate 32 on leaving the extruder unit 20 is drawn or pulled down from the larger diameter it has at point 34 to a diameter substantially equal to that of the finished product as soon as it makes first entry into the cooling chamber 40, the first entry being accompanied by an immediate initiation of the setting or hardening of the outer surface thereof.

Cooling chamber 40 is comprised of an elongated structure having parallel top and bottom walls 41, 42, as well as opposed end walls 43 and 44, the top wall including a door 47 hinged thereto as at 48 and capable of being closed in airtight connection therewith against suitable gasket means shown generally at 49. The chamber 40 constitutes an enclosure wherein may be confined a bath of cooling fluid 50, preferably water, with the chamber 40 having an exit aperture within wall 44 thereof wherein is supported a gland disc 51, which is centrally apertured as at 52 and has an internal radially directed passage 53 through which a flow of water may be communicated to the aperture 52. In this manner a seal of substantially airtight character can be provided at the exit end of the chamber 40, the water entering the gland through passage 53 functioning to prevent the incursion of air to the interior of the chamber 40 which is maintained under an evacuated condition and also to lubricate the extrudate surface.

Sizing of the extrudate 32 during the course of its passage through the chamber 40 is effected by means of a sizing assembly denoted generally at 54 and comprised of a plurality of longitudinally spaced sizing plates or discs 55a–55s, each of which has a central aperture 67 therein, the central apertures 67a–67s of the respective discs 55a–55s being arranged in axial alignment with each other.

The extruder 20 operates in a conventional fashion to form a molten thermoplastic material and to force same into the annular opening between the extruder body 22 and its mandrel 26, whereby the extrudate 32 is forced therefrom and into an entrance sizing opening 35 of the cooling chamber 40. As explained in greater detail in the above referenced U.S. Pat. No. 3,538,210, the extrudate 32 is gradually cooled in a controlled fashion and is directed along the length of the cooling chamber 40 and through the sizing apertures 67a to 67s of the thoroughly aligned sizing discs 55a to 55s. On leaving the cooling chamber 40, the extrudate 32 passes between the rotating belts 71, 72 of suitable puller device 70 which feeds the extrudate 32 through a cutting unit (not shown) wherein the continuous length extrudate is cut into sections of length more suited for further processing in cigarette making machinery.

As further explained in U.S. Pat. No. 3,538,210, the sizing apertures 67a to 67s of the sizing discs 55a to 55s are serrated in a configuration to effect cooling at a controlled rate whereby the fluted tips of the serrated apertures 67a to 67s are cooled at a greater rate than the grooves therebetween. In this manner, the circumvential dimension of the extrudate 32 is accurately controlled, as elaborated in the noted patent.

Figure 2:
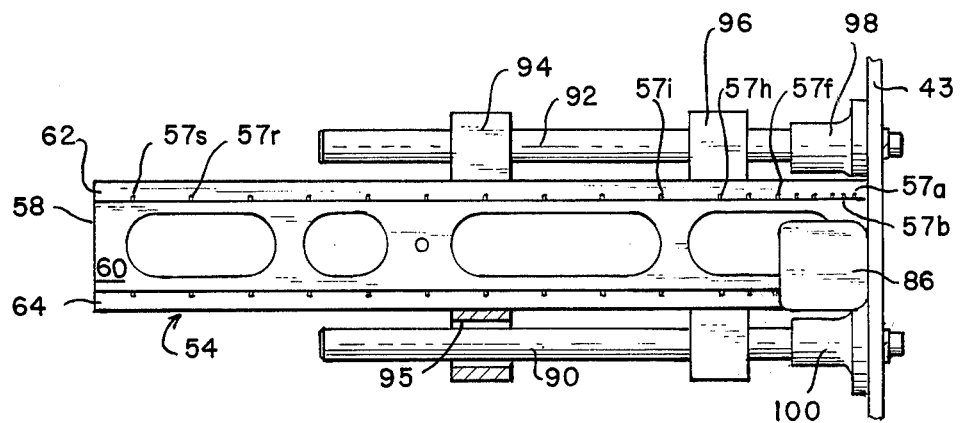
FIG. 2 is a top, plan view of an assembly of sizing discs, in accordance with the teachings of this invention, disposed within a cooling chamber of the apparatus shown in FIG. 1.
Figure 3:
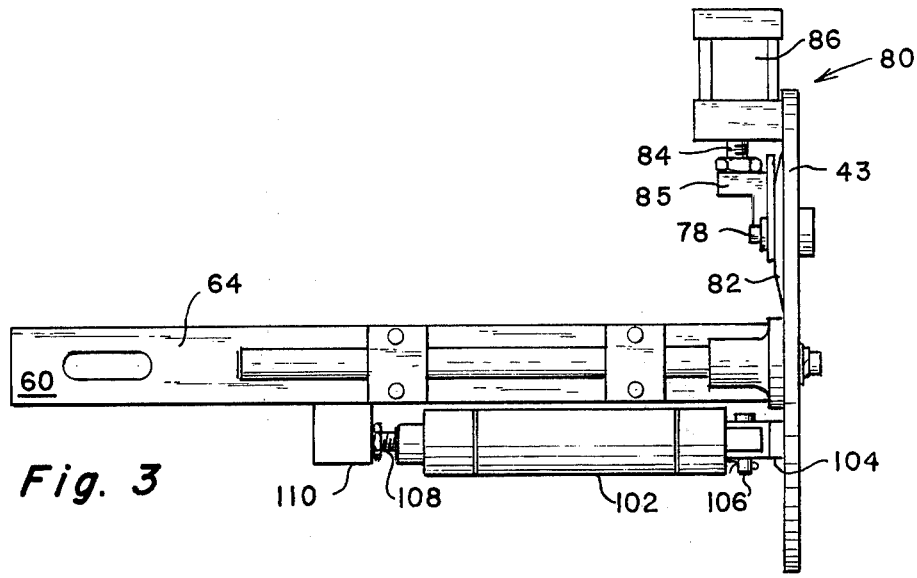
FIG. 3 is a side view of the assembly shown in FIG. 2, further showing a drive cylinder for moving the assembly of sizing discs in the direction of the extrudate.

Thus, if the grooves that are disposed about the circumference of the apertures 67, become clogged with the extrudate material, there is a tendency to lose control of the cooling process and thus the critical dimension of the extrudate 32. In accordance with teachings of this invention, there is provided means for effectively removing the extrudate materials from the grooves of the sizing apertures 67 as more particularly shown with regard to FIGS. 2 and 3. In particular, the sizing assembly 54 includes a tray 60 for receiving and mounting the plurality of sizing discs 55 in a serial, spaced relationship with each other whereby their sizing apertures 67 are axially aligned of each other and further, in a manner whereby the sizing discs 55 are readily removed for cleaning. As shown in FIGS. 2 and 3, the tray 60 includes a bottom wall 58 and side walls 62 and 64. Complementary sets of grooves 57a to 57s are disposed within the side walls 62 and 64 of a dimension to retain loosely by friction the sizing discs 55a to 55s therein respectively. Thus, if an extrudate jam is detected as described above, the operator may readily remove the sizing discs 55 by opening the door 47, as shown in FIG. 1, and withdraw them from the slots 57 within the tray 60. After cleaning, the discs 55 may be placed in the tray 60 within a relatively short period of time, thus minimizing the down time of the extrusion process apparatus.

In a further aspect of this invention, the tray 60 is coupled to means for longitudinally moving the tray 60 in the direction of extrudate flow, i.e., to the left as seen in FIGS. 2 and 3, whereby the extrudate 32 is stretched thus freeing it from the serrated or grooved interior edges of the sizing apertures 67 of the discs 55. As shown in FIGS. 2 and 3, the tray 60 has a plurality of guide members 94 and 96 fixedly attached to the side walls 62 and 64 thereof. As shown in FIG. 2, the guide members 94 and 96 each have an opening 95 therethrough for receiving first and second guide rods 90 and 92 that are supported by and extend from the entrance end wall 43. A pair of ferrules 100 and 98 are attached to the guide rods 90 and 92 respectively to firmly support them with respect to the end wall 43.

As shown in FIG. 3, a drive cylinder 102 serves as means for displacing the tray 60 in the direction of the extrudate movement, whereby the extrudate 32 tends to be freed from the interior serrated edge of the sizing apertures 67. More particularly, the drive cylinder 102 is secured at one end to the end wall 43 as by a bracket 104 fixedly attached to the end wall 43 and a pin 106 inserted therethrough. A drive piston (not shown) within the cylinder 102 directs upon entry of a suitable pneumatic medium such as air, a drive rod 108 in the direction of extrudate movement, i.e., to the left as shown in FIG. 3, to drive the tray 60 in that direction. In particular, the drive rod 108 is fixably attached to a coupling block 110, which in turn is fixedly attached to the bottom wall 58 of the tray 60.

Figure 4:
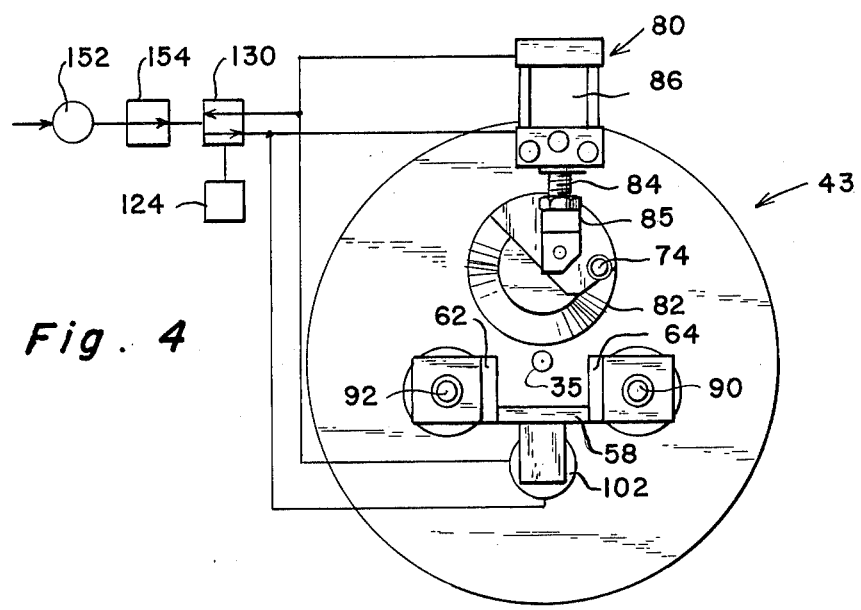
FIG. 4 is a plan, end view of the interior of the cooling chamber as shown in FIG. 1, particularly illustrating a device for severing the extrudate at a point adjacent the entrance sizing aperture into the cooling chamber and a pneumatic circuit for actuating in a substantially simultaneous fashion the aforementioned severing device and the drive cylinder associated with the assembly sizing discs.

As shown in each of FIGS. 1, 3 and 4 and in particular FIGS. 3 and 4, there is a cutter unit 80 that works in cooperation with a detection unit (not shown) that senses or detects outsized dimensions of the extrudate 32 that serves to actuate the cutter unit 80 to effect severance of the extrudate 32 at a point adjacent the entrance sizing aperture 35, as shown in FIG. 1. The cutter unit 80 includes a substantially circular cutter blade 82 rotatably mounted at a point offset from its center by a bolt 74 to be capable of a circular motion when driven by a power operated piston unit 86. In particular, the piston unit 86 is connected by a drive rod 84 and a transfer block 85 to rotate the cutter blade 82 in a generally down direction as shown in FIG. 4. It is noted that though the cutter blade is shown in FIG. 4 as being circular, a guillotine or straight edged type blade as described in U.S. Pat. No. 3,813,200 may likewise be incorporated into this invention.

As shown in FIG. 4, the piston unit 86 and the pneumatic drive cylinder 102 may be, in one illustrative embodiment of this invention, actuated in a substantially simultaneous fashion. As indicated above, a sensing unit provided for detecting an outsized condition; the operation and structure of such a unit are more fully described in the above referenced co-pending application and the specification and drawings of that application are specifically incorporated herein by reference. As described, there is provided a light projection unit for projecting a light beam adjacent the entrance sizing aperture 35 and a photocell unit disposed to receive the light beam. Upon occurrance of an outsized extrudate 32, the light beam is interrupted to actuate a detection circuit, whereby the solenoid 124 as shown in FIG. 4 is actuated. As shown in FIG. 4, the solenoid 124 is coupled to an air control valve 130 to shift it to admit air through filter 152 and regulator 154 to drive a piston (not shown) within the piston unit 86 in a downward direction as shown in FIG. 4 to drive the rod 84 and therefore the blade 82 as explained above. In a similar fashion, the flow of air is also introduced upon the detection of an outsized extrudate 32 into the drive cylinder 102, whereby its piston (not shown) is driven to the left as shown in FIG. 3, thus driving its drive rod 108 and tray 60 in the direction of the extrudate movement. It is further understood, that the detection unit also stops the operation of the extruder 20, upon detection of an outsized extrudate 32, whereby the supply of extrudate 32 to the cooling chamber 40 is terminated.

Thus, there has been shown a new and improved device for first permitting the relatively rapid cleaning of the sizing discs whereby an operator may readily enter the cooling chamber associated with an extruder to remove the discs and clean and return them rapidly to assure a minimum shut down time. Secondly, the device of this invention includes a drive means or cylinder for moving the assembly of sizing apertures in a direction corresponding to that of the extrudate to stretch the extrudate thereby tending to free it from the serrated edges of the sizing apertures of the discs.

It will thus be seen that the objects set forth above among those made apparent from the foregoing description are efficiently attained and, since certain changes in the structures set forth which embody the invention may be made without departing from its scope, it is intended that all matter contained in the above description shall be interpreted as illustrative and not in a limiting sense.

What is claimed is:

1. Apparatus for forming a continuous thermoplastic extrudate, including:
   a. means for extruding the extrudate of thermoplastic material to a predetermined dimension, said extrudate being heated to a temperature at which it can be plastically deformed;
   b. means for defining a chamber for receiving a liquid coolant therein and having an entrance sizing aperture and an exit aperture;
   c. means for advancing said heated extrudate through said entrance sizing aperture into said chamber, and through said exit aperture from said chamber;
   d. an assembly disposed within said chamber and including a plurality of spaced discs having sizing apertures axially aligned with each other and said entrance sizing and exit apertures of said chambers;

e. detection means operative to provide a control signal upon occurrence of a jam at said entrance sizing aperture;

f. drive means coupled to said assembly and responsive to said control signal for driving said assembly in the extrudate direction that said advancing means directs the extrudate, whereby upon detection of an extrudate jam at said entrance sizing aperture, said assembly is moved in the extrudate direction, thereby tending to stretch the extrudate and tending to free it from said sizing apertures of said disc; and g. extrudate severing means responsive to said control signal for severing the extrudate at a point adjacent said entrance sizing aperture into said coolant chamber.

2. The apparatus as claimed in claim 1 wherein said assembly includes a tray for receiving said plurality of spaced discs in a manner to permit the rapid removal and reinsertion thereof.

3. The apparatus as claimed in claim 2, wherein said tray includes spaced sidewalls having a set of complementary grooves in each for receiving the edges of said plurality of sizing discs.

4. The apparatus as claimed in claim 1, wherein said drive means includes a first pneumatically actuated drive cylinder having a drive rod attached to said assembly.

5. Apparatus as claimed in claim 1, wherein said severing means includes a second pneumatically actuated drive cylinder coupled to a cutter blade to be driven from a first to second position, whereby severance of the extrudate is effected.

6. Apparatus as claimed in claim 5 wherein there is included actuatable, common valve means responsive to the detection of an extrudate outsized condition for substantially simultaneously actuating said first mentioned and second drive cylinders.

7. Apparatus for forming a continuous thermoplastic extrudate, including:

a. means for extruding the extrudate of thermoplastic material to a predetermined dimension, said extrudate being heated to a temperature at which it can be plastically deformed;

b. means for defining a chamber for receiving a liquid coolant therein and having an entrance sizing aperture and an exit aperture;

c. means for advancing said heated extrudate through said entrance sizing aperture into said chamber, and through said exit aperture from said chamber;

d. an assembly disposed within said chamber and including a plurality of spaced discs having sizing apertures axially aligned with each other and said entrance sizing and exit apertures of said chambers;

e. detection means operative to provide a control signal upon occurrence of a jam at said entrance sizing aperture; and f. drive means coupled to said assembly and responsive to said control signal for driving said assembly in the extrudate direction that said advancing means directs the extrudate, whereby upon detection of an extrudate jam at said entrance sizing aperture, said assembly is moved in the extrudate direction, thereby tending to stretch the extrudate and tending to free it from said sizing apertures of said disc.

8. The apparatus as claimed in claim 7 wherein said assembly includes a tray for receiving said plurality of spaced discs in a manner to permit the rapid removal and reinsertion thereof.

9. The apparatus as claimed in claim 7 wherein said tray includes spaced sidewalls having a set of complementary grooves in each for receiving the edges of said plurality of sizing discs.

10. The apparatus as claimed in claim 7 wherein said drive means includes a first pneumatically actuated drive cylinder having a drive rod attached to said assembly.

11. The apparatus as claimed in claim 10 wherein there is further included extrudate severing means responsive to direction of an extrudate jam for severing the extrudate at a point adjacent the entrance sizing aperture into said cooling chamber.

12. Apparatus as claimed in claim 11, wherein said severing means includes a second pneumatic drive cylinder coupled to a cutter blade to be driven from a first to second position, whereby severance of the extrudate is effected.

13. Apparatus as claimed in claim 12 wherein there is included actuatable, common valve means responsive to the detection of an extrudate outsized condition for substantially simultaneously actuating said first mentioned and second drive cylinders.

* * * * *